United States Patent [19]

Huang

[11] Patent Number: 4,636,158
[45] Date of Patent: Jan. 13, 1987

[54] APPARATUS FOR MAKING BUN

[76] Inventor: Der S. Huang, No. 79, Lane 225, Sec. 1, Chung Hwa Rd., Taichung City, Taiwan

[21] Appl. No.: 798,013

[22] Filed: Nov. 14, 1985

[51] Int. Cl.$^4$ ............................................. H21C 11/10
[52] U.S. Cl. ................................. 425/133.1; 425/297; 425/299
[58] Field of Search ...................... 425/133.1, 287, 297, 425/298, 299

[56] References Cited

U.S. PATENT DOCUMENTS

| 1,280,004 | 9/1918 | Excoffier | 261/44 H |
|---|---|---|---|
| 1,900,854 | 3/1933 | Arge | 425/287 |
| 2,578,229 | 12/1951 | Clement et al. | 425/466 |
| 2,712,169 | 7/1955 | Buttress | 425/298 |
| 2,712,693 | 7/1955 | Comparette | 425/10 |
| 3,160,493 | 12/1964 | Kuppers | 264/148 |
| 3,592,885 | 7/1971 | Goins et al. | 425/297 |
| 4,028,024 | 6/1977 | Moreland | 425/133.1 |
| 4,251,201 | 2/1981 | Krysiak | 425/132 |
| 4,534,726 | 8/1985 | Simulunas | 425/298 |

FOREIGN PATENT DOCUMENTS

1355317 2/1964 France .................. 425/298

Primary Examiner—Tim Miles
Attorney, Agent, or Firm—Cushman, Darby & Cushman

[57] ABSTRACT

An apparatus for making buns has a bun forming unit which includes a housing receiving a rotatable plate having a central circular opening, and die pieces of elongate shape provided on the plate substantially in a radial direction. The die pieces are pivoted at their intermediate portions to the top inner side of the housing, and engage at their outer ends with the plate. The inner portions of the die pieces extend into the opening of the plate and each of them are provided with a cutting edge and a forming face at their inner tapered end. The die pieces can move to and from a forming position upon an intermittent motion of the plate within a limited angle.

9 Claims, 15 Drawing Figures

FIG. 1

PRIOR ART

FIG.15

APPARATUS FOR MAKING BUN

BACKGROUND OF THE INVENTION

The invention relates to an apparatus for making buns, particularly to one including a bun forming unit capable of imparting a pattern on the bun.

Figure 1:
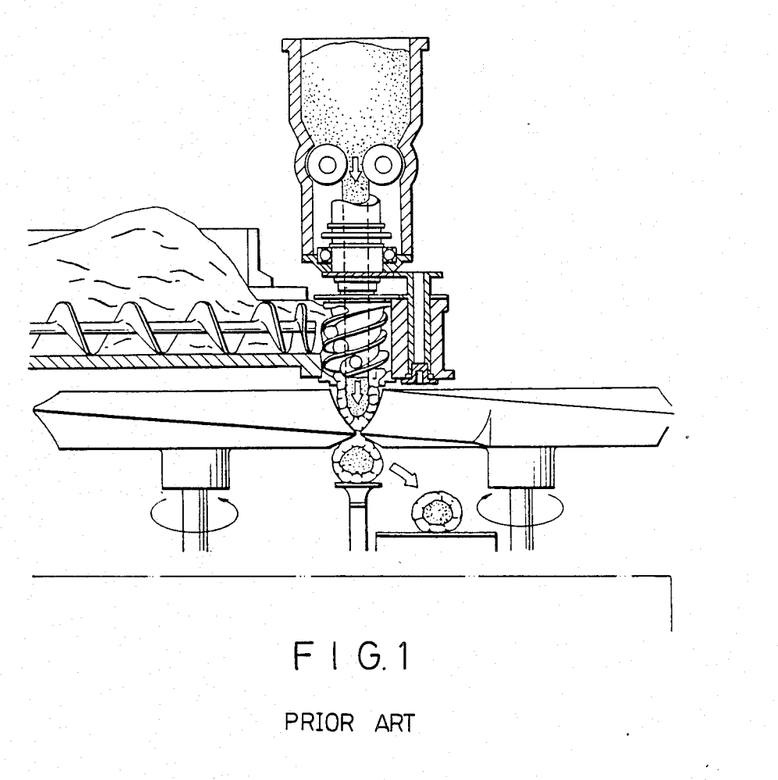
FIG. 1 is a schematic view of a conventional bun making apparatus.

It is known in the art to provide an apparatus for continuously making buns with seasoned meat or vegetable or the like enclosed therein. Generally, the apparatus includes a dough feeding unit, a meat feeding unit and a bun forming unit. The dough feeding unit feeds the dough through a conduit to the forming unit provided just below it, and the meat feeding unit feeds the meat through a smaller conduit provided in the dough conduit, a certain amount of meat being stuffed into the dough by an intermittent push of the meat feeding unit. In a conventional bun forming unit, two rotary discs are provided which are tangent to one another and have a helical ridge on their peripheries, as shown in FIG. 1. The helical ridges of the discs cut and form the dough into buns which are stuffed with meat. Using such a forming unit, no pattern can be formed on the bun.

SUMMARY OF THE INVENTION

An object of the invention is to provide a novel bun making apparatus which can form a pattern on buns.

The invention provides an apparatus for making buns from a dough which is continuously fed through a conduit comprising: a housing having a cavity, an upper inlet opening and a bottom outlet opening communicated with the cavity; a circular plate member rotatably mounted in the cavity, which has a concentric central opening aligned with the inlet and outlet openings; a plurality of die pieces provided on the circular plate in the cavity, each of the die pieces including an elongate inner portion which is tapered and extends into the central opening of the plate and which has a cutting edge and an arcuate forming face below the cutting edge, an outer elongate portion engaging with the plate at the lateral portion of the plate, and an intermediate portion between the inner and outer portions pivoted to the inner top side of the housing; and means for turning the plate counter-clockwise and clockwise intermittently within a certain angle so as to move the die pieces between a first position and a second position. The inner portions of the die pieces extend radially and abut against each other at their cutting edges to cut and form the dough into a bun when the plate is in the first position. The cutting edges of the inner portions moving away from each other when the plate is in the second position to allow the formed dough to be released from the die pieces. Preferably, the inner portion of each die piece is inclined slightly relative to the outer portion so that they form a obtuse angle between them.

In one aspect of the invention, the plate member has a plurality of elliptical slots annularly disposed at intervals, and the outer portions of the die pieces have a cylindrical pin projecting therefrom to engage with each of the slots.

In another aspect of the invention, the intermediate portion of each of the die pieces includes a recess opening at its bottom side which is in contact with the top surface of the plate, an oblong aperture above the recess which is smaller in cross-section than and communicated with the recess, a bearing received in the recess, which has a top cylindrical central protrusion extending through the aperture to be screwed to the housing, and a spring member for biassing the bearing member against the intermediate portion.

In a further aspect of the invention, the innter portion of each of the die pieces includes a top flat face, two parallel side faces of different lengths perpendicular to the top face, a bevel face interconnecting the side faces, and a tapered end between the bevel face and the longer one of the side faces. The cutting edge projects slightly from the tapered end, and the forming face conforms to the contour of an arcuate, triangular gore segment, intersecting the bevel face, the tapered end face and the longer side face. These forming faces impart a dome shape with several arcuate indentations to each bun formed.

In still further aspect of the invention, the tapered end of each die piece has a first V-shaped notch above the cutting edge and a second V-shaped notch between the cutting edge and the forming face.

In still yet another aspect of the invention, means for turning the plate includes a power means for producing a continuous rotational motion, a mechanism for converting the continuous rotational motion into a geneva motion, and a crank mechanism for changing the geneva motion into a reciprocating motion.

The present exemplary preferred embodiment will be described in detail with reference to the following drawings, in which:

DETAILED DESCRIPTION OF THE PREFERRED EMBODIMENT

Referring to the drawings, a prefered embodiment of the invention includes a meat feeding unit 20, a dough feeding unit 40 and a bun forming unit 60.

Figure 2:
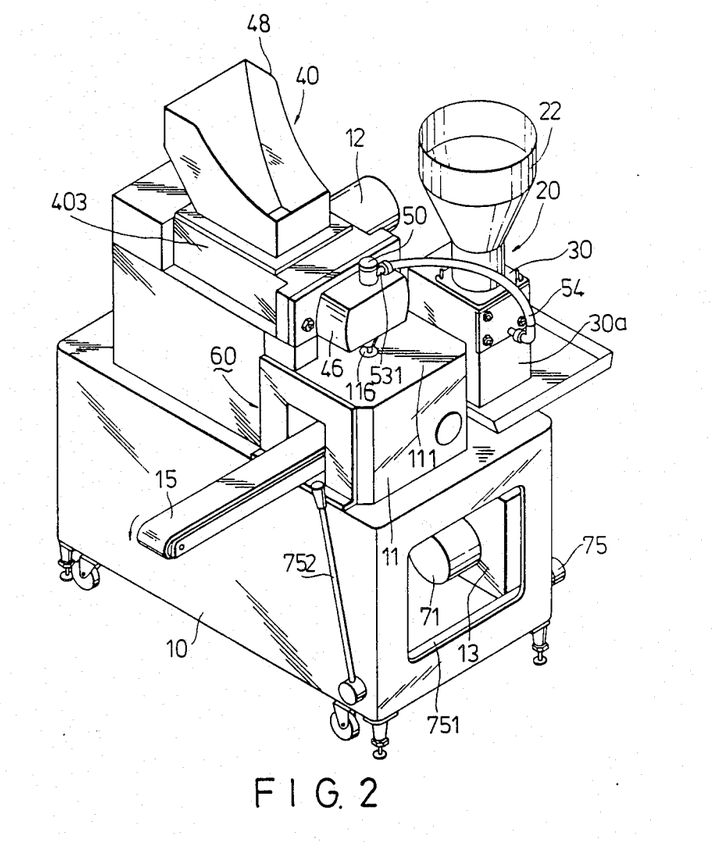
FIG. 2 is a schematic view of a bun making apparatus according to the present invention.
Figure 3:
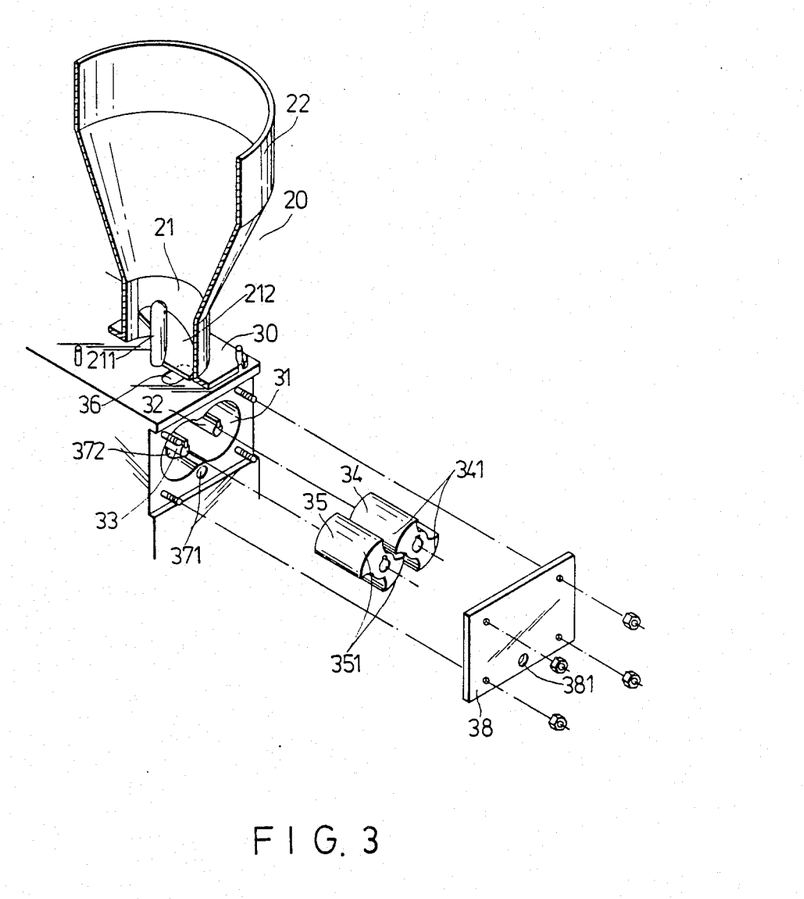
FIG. 3 is an exploded view of a meat feeding unit.

As shown in FIGS. 2 and 3, the meat feeding unit 20 includes a housing 30 which has a cavity 31 with a cross-section conforming to two overlapping circles, an elliptical inlet opening 36 communicated with the cavity 31, and a discharge passage 372 at the bottom part of the housing 30, which has an outlet opening 371. Two shafts 32 and 33 are mounted in the cavity 31, and two rotors 34 and 35 are mounted on and splined to the shafts 32 and 33 respectively. A hopper 22 is mounted on the top side of the housing 30 for accommodating a certain amount of seasoned meat. It is communicated with the inlet opening 36 to allow the meat to enter into the cavity 31. A rotary blade 21 is disposed in the hopper 22, which is in the shape of a segment of a helix and is attached to a rotary vertical shaft 211 mounted on the top of the housing 30. The blade 21 closes the opening 36 intermittently, when it rotates, and advance a certain amount of meat into the cavity 31 whenever the opening 36 is opened.

The cavity 31 is closed by a cover 38 which is screwed to the front side of the housing 30 and has an opening 381 aligned with the outlet opening 371 of the discharge passage 372. The rotors 34 and 35 have their curved surfaces 341 and 351 in sliding contact with the inner surface of the cavity 31. They turn intermittently at a limited angle in opposite directions and squeeze intermittently a certain amount of meat into the discharge passage 372. A mechanism for operating the rotary blade 21 and the rotars 34 and 35 will be described in detail hereinafter.

Figure 4:
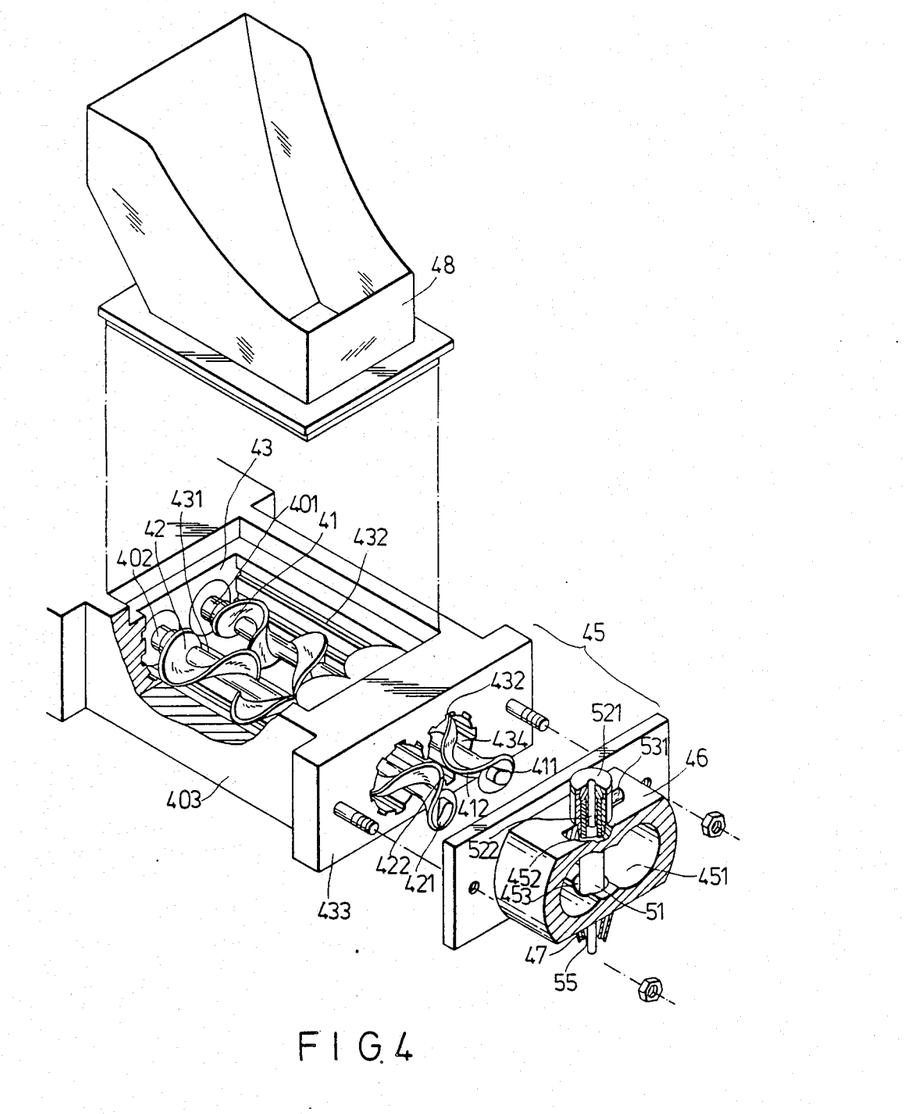
FIG. 4 is an exploded view of a dough feeding unit.
Figure 5:
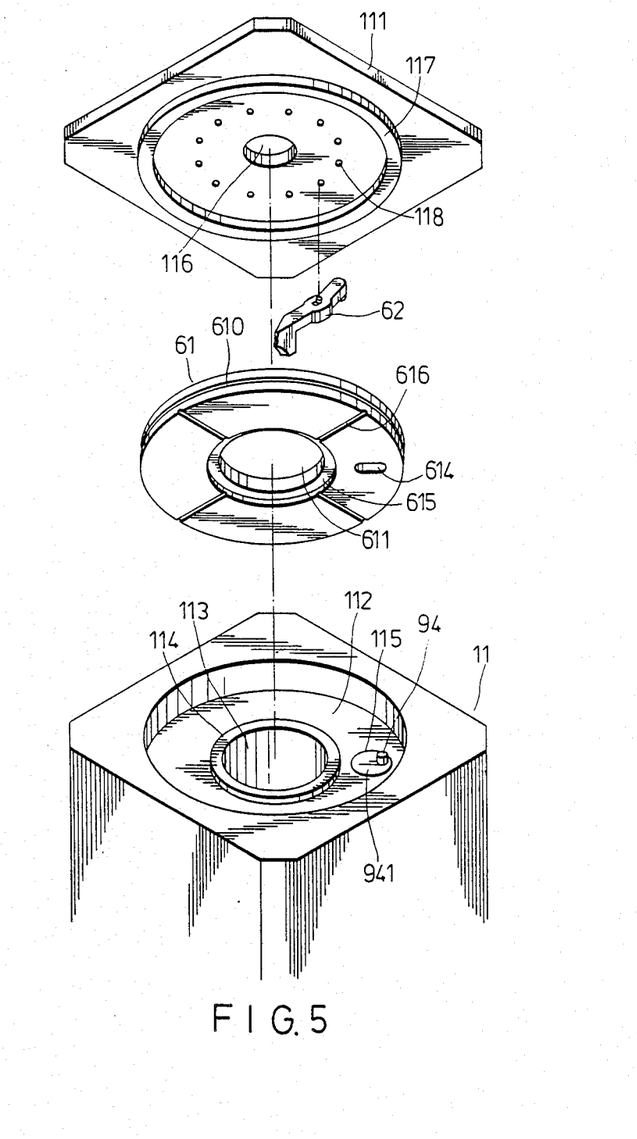
FIG. 5 is a view of the forming unit.

Referring to FIG. 4 in combination with FIG. 2, a dough feeding unit 40 includes a housing 403 having a cavity 43 in which are mounted two conveying screw members 41 and 42, a squeezing means 45, and a hopper 48. The hopper 48 is mounted on the top side of the housing 403 for receiving dough and is communicated with the cavity 43. The cavity 43 has a cross-section conforming to two overlapping circles, and an opening 434 is provided at the front side of the housing 403. The inner surface of the housing 403 is provided with a plurality of guide grooves 432.

At the rear side of the housing 403 are mounted two rotating shafts 401 and 402 operated by a motor 12. The conveying screw members 41 and 42 are connected to the shafts 401 and 402 respectively. The front portions of the screw members 41 and 42 extend out of the housing 403 through the opening 434 into a squeezing chamber 451 of a casing 46 which is attached to the front side of the housing 403. The cross-section of the squeezing chamber 451 is almost the same as that of the cavity 43. The front portions 411 and 421 of the screw members 41 is smaller in size than that of the remaining portions. When the screw members 41 and 42 are rotated, they transport the dough from the hopper 48 to the squeezing chamber 451.

In the chamber 451 is mounted a meat conduit 51 which is screwed to a socket 452 of the casing and passes through an opening 453 of the casing. The top portion of the conduit 51 has an enlarged portion which is provided with a spout 531 connected to a hose 54 which is connected in turn to the discharging opening of 381 of the meat discharging unit 20. An insert tube 522 with a collar 521 is screwed to the top of the conduit 51 for introducing air. The opening 453 is greater in diameter then that of the conduit 51 so that an annular space 55 is formed around the meat conduit 51. A hollow conical member 47 is connected to the bottom of the casing 46 at the opening 453. The dough that is sent to the chamber 451 is pressed by the blade portions 412 and 422 and then squeezed into the annular space 55 of the conical discharge member 47. While the dough is pressed into the annular space 55, the meat is squeezed intermittently into the meat conduit 51.

Referring to FIGS. 5, 6, 7, 8 & 9 in combination with FIG. 2, the forming unit includes a housing 11 provided below the casing 46. The housing 11 has a cavity 112 of circular cross-section which receives a circular plate 61 in a movable position. The circular plate 61 has a central circular opening 611 and a bottom annular recess 615 which is concentric with and greater in diameter than the opening 611. The cavity 112 and the circular plate 61 are generally the same in diameter. An outlet circular bore 113 is provided in the housing 11, which is communicated with the cavity 112 and which is in alignment with the central opening 611 of the plate 61. The bottom side of the inner surface of the housing 11 is provided with an annular projection 114 extending in the annular recess 615 of the circular plate 61 so as to retain the plate 61 in a proper position.

Figure 6:
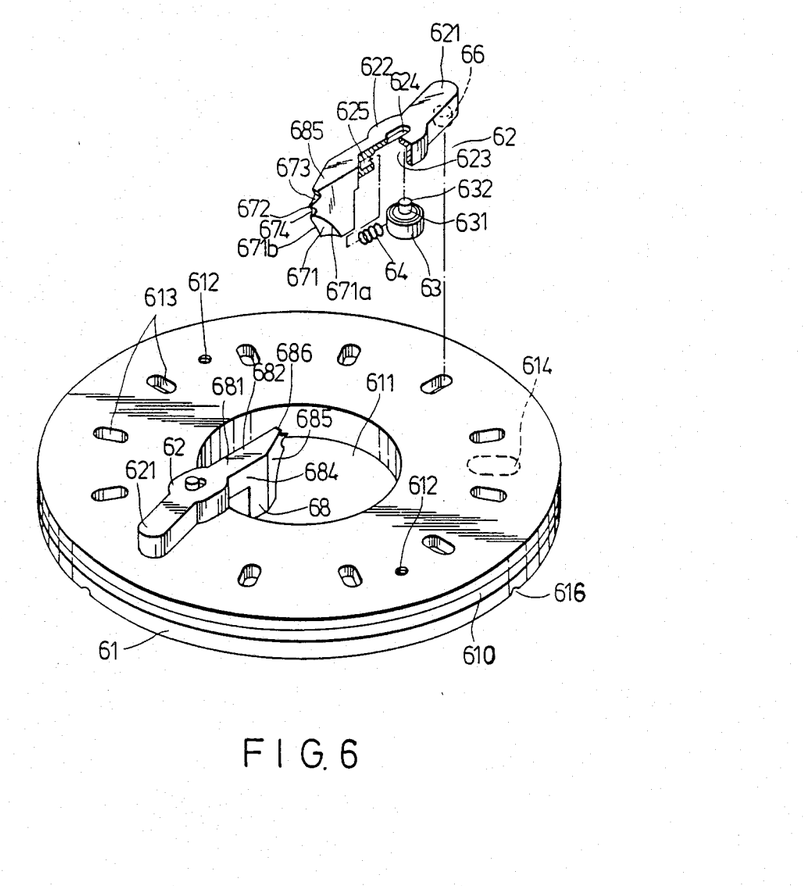
FIG. 6 is a view showing the plate and die pieces of the forming unit.

At the lateral portion of the circular plate 61 are twelve elliptical slots 613 annularly provided at intervals. Two screw holes 612 are provided in the plate 61 so that the plate 61 can be put into or out of the cavity by means of two rods having screw threads.

Figure 9:
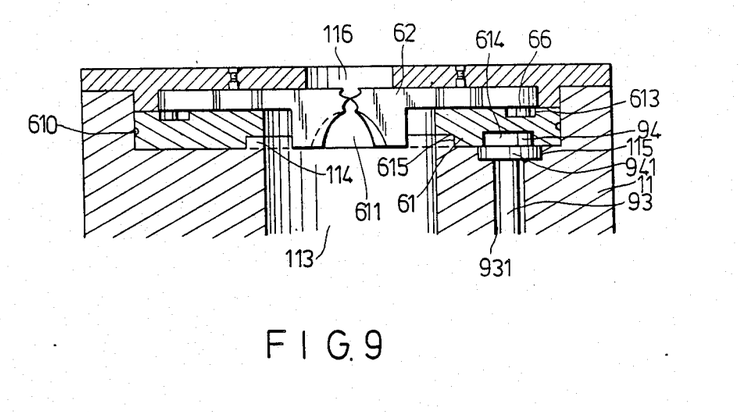
FIG. 9, is a sectional view of the forming unit.

At the top of the housing 11 is a cover plate 111 which has an annular boss 117 at its bottom side projecting into the cavity 112 to prevent the circular plate 61 from moving upward, and an opening 116 in alignment with the central opening 611 of the circular plate 61. The opening 116 of the cover plate 111 is just below the ends of the discharge conical member 47 and the meat conduit 51.

The plate 61 is further provided with an oblong recess 614 opening at its bottom side, which receives a pin 94 projecting from a disc 941. The disc 941 is rotatably received in a cavity 115 and is connected to a shaft 93 extending into a bore 931 of the housing 11. The shaft 93 can make a geneva motion to turn the plate 61 reciprocatingly clockwise and counter-clockwise at intervals. The means for operating the shaft 93 will be described in detail hereinafter.

There are 12 die pieces 62 provided on the circular plate 61. It should be understood that the number of the die pieces is not limited in the invention and can be more or less than 12 as needed. Each die piece 62 has an outer rod portion 621 which has a bottom cylindrical pin 66 engaging with each elliptical slot 613 of the plate 61. The intermediate portion 622 of each die piece is broader than the outer rod portion 621 and has a recess 623 opening at it bottom side and receiving a bearing member 63. The bearing member 63 has a top cylindrial protrusion 631 projecting into a top elliptical aperture 624 of the die piece 62. The cylindrical protrusion 631 of each bearing member 63 has a screw hole 632 by which the bearing member 63 is screwed to the top cover plate 111 at each screw hole 118, thereby pivoting each die piece 62 to the top cover 111. A helical spring 64 is received in a recess 625 of each die piece 62, and its ends bear against the periphery of the bearing 63 and an opposite surface of the die piece 62.

Figure 7:
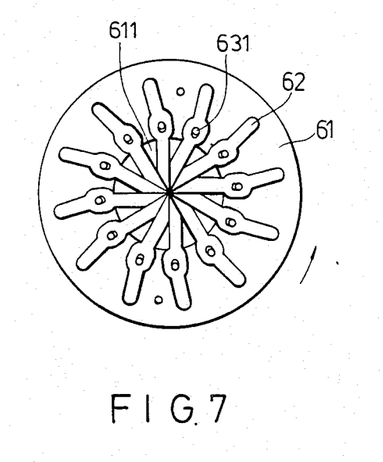
FIG. 7 shows the die pieces when they are in the position to cut and form the bun.

The inner portion 68 of each die piece 62 is in an elongate shape and tapered inwardly. It slightly inclines relative to the outer portion 621 so that they form an obtuse angle between them and extends into the central opening 611 of the plate 61. A part of the inner portion 68 is thickened so that its bottom side can extend to the bottom of the opening 611 of the plate 61. The inner portion 68 of each die piece 62 has a top flat face 681, two parallel side faces 682 and 684, a bevel face 685 and a tapered end 686. A cutting edge 672 projects from the tapered end 686, and two V-shaped notches 673 and 674 are provided at the tapered end, one above the cutting edge 672 and the other below the cutting edge 672. A forming face 671 is formed below the the notch 674. It conforms to the contour of an arcuate, triangular gore segment and intersects the tapered end 686, longer side face 682 and bevel face 684, forming two curved sides 671a and 671b.

Figure 8:
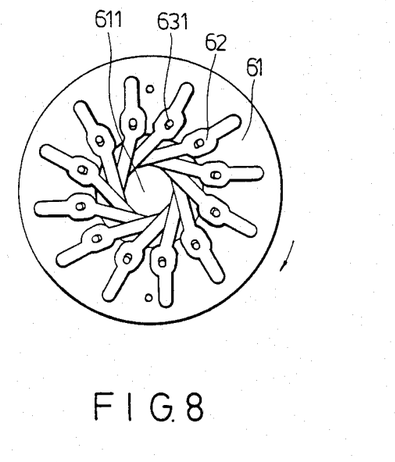
FIG. 8 shows the die pieces when they are not in the position to cut and form the bun.

When the circular plate 61 is moved by the pin 94 counterclockwise and clockwise, die pieces 62 turn about their pivot axes between a cutting and forming position and a releasing position. In the cutting and forming position, the inner portions 68 of die pieces 62 lie radially, cutting edges 672 of die pieces 62 abut against each other almost at a point and the forming faces 671 are side by side adjacent to each other, as shown in FIG. 7. In the releasing position, the inner portion 68 of each die piece 62 moves from the radial position, as shown in FIG. 8.

Referring again to FIG. 1, a conveyer belt 15 operated by the motor 12 is provided in the bottom portion of the housing 11 below the opening 611 of the plate 61 and extends out of the housing 11.

Figure 10:
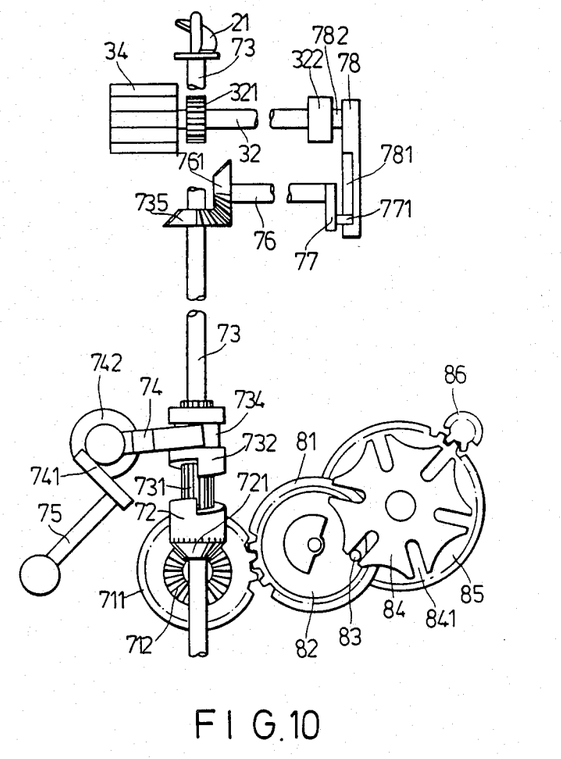
FIGS. 10, 11, 12 and 13 show a mechanism for operating the meat feeding unit, the dough feeding unit and the forming unit.
Figure 11:
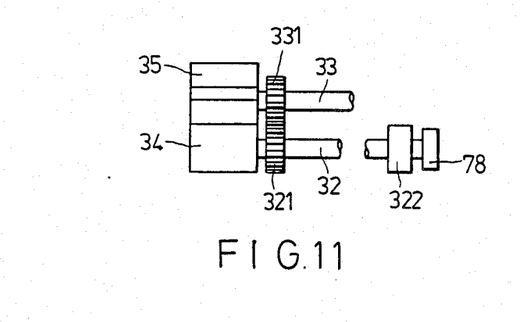

A mechanism that operates the meat feeding unit and the circular plate 61 will be described in detail hereinafter. As shown in FIGS. 2, 10 and 11, the mechanism is provided in a bottom housing 10, which includes a motor 71 attached to a casing 13 mounted in the housing 10, the casing 13 housing some parts of the mechanism. To the shaft of the motor 71 is attached a spur gear 711, through which motion can be transmitted to the circular plate 61 of the forming unit, and a bevel gear 712, through which motion can be transmitted to the meat feeding unit.

There is a clutch assembly including a clutch sleeve 72 and a clutch sleeve 732 mounted on a vertical shaft 73. The clutch sleeve 72 is movable relative to the shaft 73 and has a bevel gear portion 721 which is meshed with the bevel gear 712. The clutch sleeve 732 is fixed to the shaft 73 by means of a grooved sleeve 731. An annular groove 734 is provided around the clutch sleeve 732, in which is attached a Y-shaped forked end of a crank 74. The crank 74 is connected to a rotary member 742 which is mounted in the housing 10 and connected to an arm 741 of another crank 75. The crank 75 is connected to a horizontal rod 751 which is connected to a lever 752 provided outside the housing 10. When the lever 752 is turned rearward, the crank 75 turns clockwise, rotating the rotary member 742 and the crank 74 counter-clockwise so that the clutch sleeve 732 disengages from the clutch sleeve 72. On the contrary, if the lever 752 is turned forward, the crank 75 turns counterclockwise, rotating the rotary member 742 and the crank 74 clockwise so that the clutch sleeve 732 engages with the clutch sleeve 72. By means of the clutch assembly provided on the shaft 73, the meat feeding unit can be put into an operative position or a non-operative position.

The upper portion of the shaft 73 extends into the housing 30 of the meat feeding unit, passing through a housing 30a below the housing 30. A bevel gear 735 is mounted on the upper portion of the shaft 73 and meshed with another bevel gear 761 which is mounted on a shaft 76 mounted in the housing 30a. To the end of the shaft 76 which extends out of the housing 30 is attached a crank 77 having a camming pin 771. The camming pin 771 projects into a groove 781 of an arm 78 which has a connecting rod 782 connected to the end of the shaft 32 that drives the rotor 34 of the meat feeding unit. A ratchet bearing 322 is provided at the joint of the shaft 32 and the connecting rod 782. Due to the action of the camming pin 771 on the arm 78, the arm 78 will swing to and fro when the shaft 76 is rotated. As the arm 78 swings, the connecting rod 782 will turn clockwise and counterclockwise reciprocatingly within a limited angle. Because of the presence of the ratchet bearing 322, the shaft 32 will turn only at a limited angle in a single direction when the shaft 76 makes one revolution, and the continuatious rotation of the shaft 76 will cause the shaft 32 to rotate in a single direction with an intermittent limited angular motion. The shaft 32 connected to the rotor 34 is provided with a gear 321 which is meshed with another gear 331 mounted on the shaft 33 of the rotor 35. In operation, the rotors 34 and 35 turn in opposite directions at a limited angle, whenever the wheel 87 makes one turn. The top end of the shaft 73 extends through the cavity 31 of the housing 30 of the meat feeding unit and is connected to the shaft 211 for rotating the blade 21 provided in the hopper 22 of the meat feeding unit.

The spur gear 711 which is mounted on the shaft of the motor 71 is meshed with a spur gear 81. A rotary cam 82 which is mounted on the same shaft as the spur gear 81 is provided with a cam pin 83 at its lateral portion. A rotary cam follower 84 is mounted in the housing 10 in such a manner that the cam pin 83 can engages with radial grooves 841 of the cam follower 84. The cam follower 84 is mounted coaxially with a gear 85 which is meshed with a smaller gear 86. Whenever the rotary cam 82 makes one revolution, the cam pin 83 cams the cam follower 84 to make one sixth revolution and then allows the cam follower 84 to rest until it returns to engage with a next groove 841 of the cam follower 84. When the cam follower 84 rotates one sixth of a revolution, the gear 85 will itself rotate one sixth of a revolution and will turn an adjacent gear 86 by 360 degrees simultaneously, as shown in FIG. 10. The rotation of the gear 86 is a geneva motion.

Figure 12:
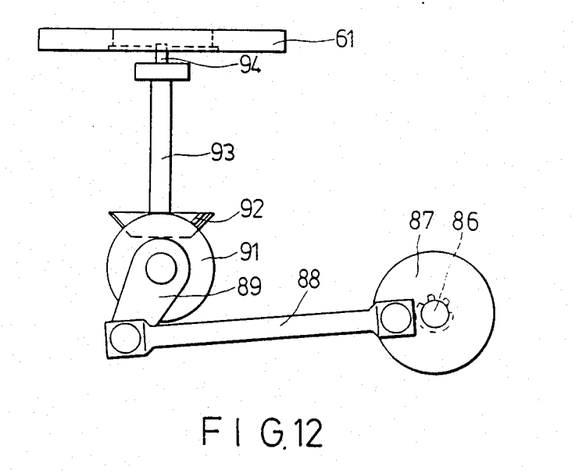
Figure 13:
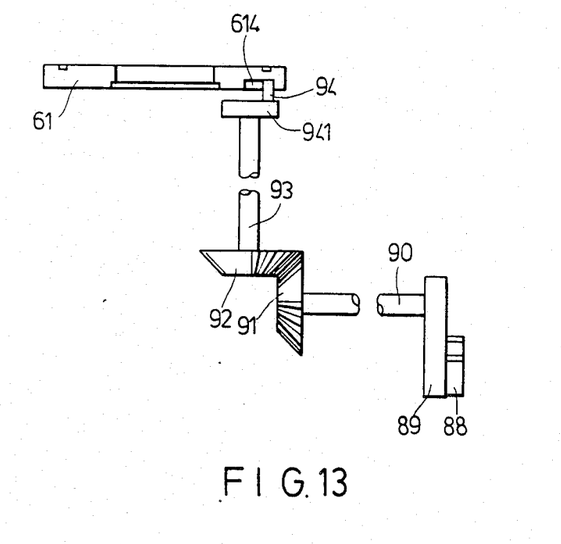

Referring to FIGS. 12 and 13, there is a wheel 87 coaxially mounted with the gear 86 for making a single turn at intervals. A connecting rod 88 is connected to the wheel 87 at a point away from the center of the latter and connected at its other end to a crank 89 so as to move backward and forward. The crank 89 is connected to a shaft 90 on which is mounted a bevel gear 91, and bevel gear 91 is meshed with another gear 92 so that the motion of the wheel 87 is transmitted to the gear 92. The gear 92 will make a clockwise turn with a successive anticlockwise turn within a limited angle, when the wheel 87 makes one turn of 360 degrees and then stops moving until the wheel 87 makes the next motion. There is a wheel 941 mounted on the top of a shaft 93 which holds the bevel gear 92 for moving in the same manner as the gear 92. The shaft 93 extends into the housing 11 and transmits a motion to the disc 941 and the camming pin 94 for turning the plate 61 which is described above. The circular plate 61 can make a counter-clockwise motion with a successive clockwise motion within a limited angle, whenever the wheel 87 makes one turn.

Figure 14:
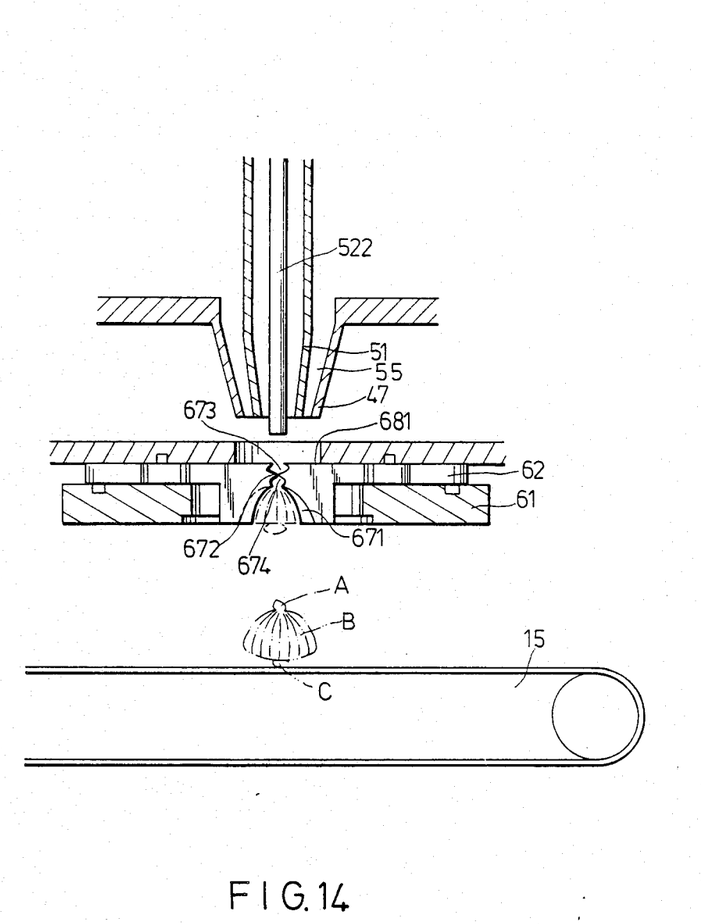
FIG. 14 is a sectional view showing how buns are formed from the forming unit.

Referring to FIG. 14, the dough is discharged onto the flat faces 681 of die pieces 62, when die pieces 62 are in their cutting and forming position, from the annular space 55 of the conical discharge member 47, and at the same time, a certain amount of meat is discharged at interval from the meat conduit 51. The dough flows downward by gravity through an opening defined by die pieces 62 when they move away from the forming position. When die pieces 62 move back to the forming position, their cutting edges 672 cut the dough and their forming faces 671 form the cut dough into a bun A. As soon as the bun is formed die pieces 62 move away from the forming position and allow the bun to fall onto the conveyor belt.

It can be seen that the bun A has a top nodule B and a bottom nodule C. The shape of the nodules B and C are imparted by notches 673 and 674 respectively of die pieces 62 and the pattern of the bun is imparted by the arcuate forming faces 671 and their curved sides 671a and 671b. The forming faces 671 are so designed that they impart a dome shape with a several arcuate indentations to the bun, the indentations being formed by the curved sides 671a and 671b.

Figure 15:
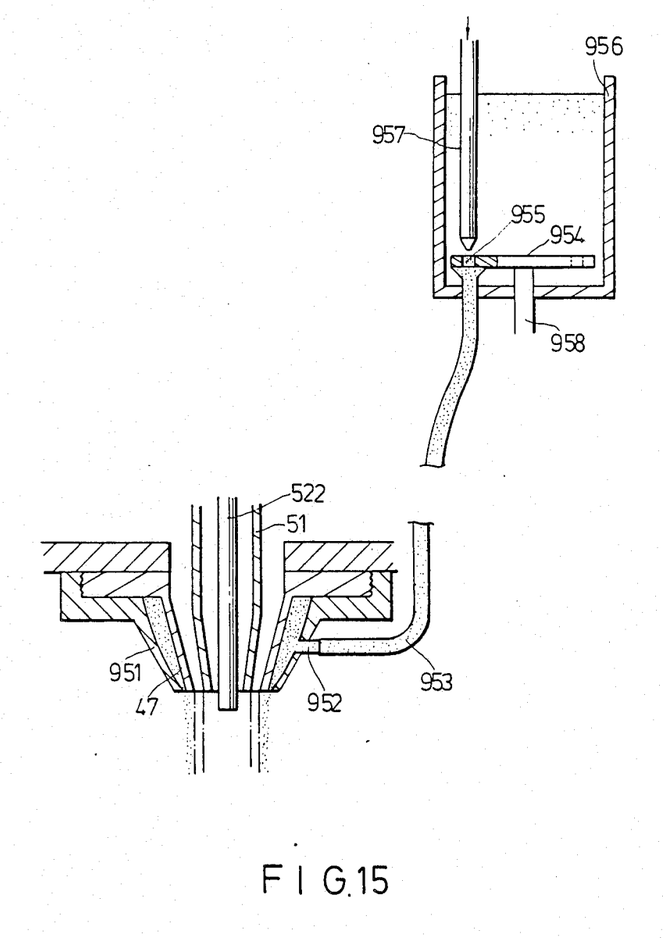
FIG. 15 is a schematic view showing a flour sprinkling unit to be used with the present apparatus.

Referring to FIG. 15, a means for sprinkling flour onto the dough can also be incorporated in the dough feeding unit. The conical discharge member 47 of the dough feeding unit is surrounded by another hollow conical member 951 which has a spout 952 connected to a hose 953. The hose 953 is connected in turn to a container 956 which accommodates wheat flour. There is a rotary plate 954 having annularly spaced apart holes 955. The rotary plate 954 is rotated by a shaft 958, which is driven by the motor 12, for agitating the wheat flour. The end of the hose is placed just below a hole 955 of the rotary plate 954. A current of blowing air is directed into the container 956 through a conduit 956 of which the bottom end terminates at a location just above the hole 955. While the wheat flour is agitated, the air blows the flour into the hose 953. As such, the wheat flour can be blown into the conical member 951 through the hose 953 and sprinkled onto the dough flowing out from the conical member 47. This flour can keep the dough dry and can prevent the dough from sticking to the die pieces.

With the invention thus explained, it is apparent that various modifications and variations can be made without departing from the scope of the invention. It is therefore intended that the invention be limited as indicated in the appended claims.

What I claim is:

1. An apparatus for making buns from dough which is continuously fed through a conduit comprises: a housing having a cavity, an upper inlet opening and a bottom outlet opening communicated with said cavity; a plate member rotatably mounted in said cavity, which has a concentric central opening aligned with said inlet and outlet openings; a plurality of die pieces provided on said circular plate in said cavity, each of said die pieces including an elongate inner portion which is tapered and extends into said central opening of said plate and which has a cutting edge and an arcuate forming face below said plate at the lateral portion of said plate, and an intermediate portion between said inner and outer portions pivoted to the inner top side of said housing; and means for turning said plate counter-clockwise and clockwise intermittently within a certain angle so as to move said die pieces between a first position and a second position, said inner portions of said die pieces extending radially and abutting against each other with said cutting edges to cut and form the dough into a bun when said plate is in the first position, said cutting edges of said inner portions moving away from each other when said plate is in the second position to allow the formed dough to be released from said die pieces.

2. An apparatus as claimed in claim 1, wherein said inner portion of each of said die pieces inclines slightly relative to said outer portion so that they form an obtuse angle between them.

3. An apparatus as claimed in claim 1, wherein said plate member has a plurality of elliptical slots annularly disposed at intervals, and said outer portions of said die pieces have cylindrical pins projecting therefrom to engage with said slots.

4. An apparatus as claimed in claim 1, wherein said intermediate portion of each of said die pieces includes a recess opening at its bottom side which is in contact with the top surface of said plate, an oblong aperture above said recess which is smaller in cross-section than and communicated with said recess, a bearing received in said recess, which has a top cylindrical central protrusion extending through said aperture to be screwed to said housing, and a spring member for biassing said bearing member against said intermediate portion.

5. An apparatus as claimed in claim 1, wherein said turning means includes a power means for producing a continuous rotational motion, a mechanism for converting said continuous rotation motion into a geneva motion, and a crank mechanism for changing said geneva motion into a reciprocating motion.

6. An apparatus as claimed in claim 1, wherein said inner portion of each of said die pieces includes a top flat face, two parallel side faces of different lengths perpendicular to said top face, a bevel face interconnecting said side faces, and a tapered end between said bevel face and the longer one of said side faces, said cutting edge slightly projecting from said tapered end, and said forming face conforming to the contour of an arcuate, triangular gore segment, intersecting said bevel face, said tapered end face and said longer side face.

7. An apparatus as claimed in claim 6, in which each of said forming faces has two curved sides formed by the intersection of said forming face and said bevel face and formed by the intersection of said forming face and said longer side face, whereby said forming faces of said die pieces imparts to a bun a dome shape with several arcuate indentations.

8. An apparatus as claimed in claim 6, wherein said tapered end further has a first V-shaped notch above said cutting edge and a second V-shaped notch between said cutting edge and said forming face.

9. An apparatus as claimed in claim 8, wherein said turning means imparts to said plate a reciprocating counter-clockwise and clockwise motion within a predetermined angle at a predetermined interval, so that said die pieces move to a forming position with an immediate motion to a position away from the forming position at said interval.

* * * * *